US007106053B2

(12) United States Patent
Desbiolles

(10) Patent No.: US 7,106,053 B2
(45) Date of Patent: *Sep. 12, 2006

(54) ABSOLUTE ANGLE SENSOR WITH A MAGNETIC ENCODER HAVING EVEN SPACED REFERENCE PULSES

(75) Inventor: Pascal Desbiolles, Thorens-Glieres (FR)

(73) Assignee: Timken US Corporation, Torrington, CT (US)

( * ) Notice: Subject to any disclaimer, the term of this patent is extended or adjusted under 35 U.S.C. 154(b) by 371 days.

This patent is subject to a terminal disclaimer.

(21) Appl. No.: 10/674,629

(22) Filed: Sep. 29, 2003

(65) Prior Publication Data

US 2004/0113382 A1 Jun. 17, 2004

(30) Foreign Application Priority Data

Sep. 27, 2002 (FR) ................................. 02 12016

(51) Int. Cl.
*G01B 7/30* (2006.01)
(52) U.S. Cl. .................................. 324/207.25
(58) Field of Classification Search ............ 324/207.25
See application file for complete search history.

(56) References Cited

U.S. PATENT DOCUMENTS 5,065,324 A 11/1991 Oshita et al.
2002/0024336 A1 2/2002 Desbiolles et al.

FOREIGN PATENT DOCUMENTS

EP 0321439 6/1989
EP 1167927 1/2002

*Primary Examiner*—Reena Aurora
(74) *Attorney, Agent, or Firm*—Michael, Best & Friedrich LLP

(57) ABSTRACT

A device for determining the absolute angular position of a turning device with respect to a fixed structure, including an encoder provided with a main multipolar track and a multipolar track called "top turn," and a measurement means. The top turn track includes M singularities. The measurement means measures the angular position of the turning device with an angular uncertainty $\Delta\theta$, in which the M singularities are each representative of an absolute angular position of the turning device and are distributed over the top turn track with an angular separation between each one greater than $2\Delta\theta$.

7 Claims, 3 Drawing Sheets

ABSOLUTE ANGLE SENSOR WITH A MAGNETIC ENCODER HAVING EVEN SPACED REFERENCE PULSES

BACKGROUND

The invention involves a device for determining the absolute angular position of a device turning with respect to a fixed structure, a steering system for an automotive vehicle as well as a bearing including such a device.

In numerous applications, especially automobiles such as trajectory control systems or electric power-assisted steering systems, we need to know the absolute angular position of a device turning with respect to a fixed structure.

By absolute angular position is understood the angle separating the position of the turning device at a given instant, from a reference position of a turning device, this reference position is fixed and given with respect to the fixed structure.

By contrast, the relative angular position is the angle separating the device's position from an arbitrary and variable initial position with respect to the fixed structure.

Such a device is known from document EP-1 167 927 which specifically uses an encoder intended to be set in rotation together with the turning device, said encoder includes a main multipolar track and a multipolar track called "top turn" which are concentric, this top turn track includes a singularity so that the associated sensor delivers one pulse per revolution of the encoder. After being placed in service, such a device determines the absolute angular position after the detection of the first top turn pulse.

One limitation of this device is the pulse detection only occurs once per revolution of the encoder. In some cases, it turns out that a significant angular displacement of the turning device should be performed before learning the absolute angular position. And with the known device, it is not possible to increase the number of singularities per revolution of the encoder from the inability to discriminate between them.

SUMMARY

The invention specifically proposes a perfected device which, after its commissioning, allows the determination of the absolute angular position of the encoder after an angular displacement which is reduced and adjustable as a function of the application envisaged.

For this purpose, and according to a first feature, the invention proposes a device for determining the absolute angular position of a turning device with respect to a fixed structure, said device includes:

An encoder intended to be placed in rotation together with the turning device, said encoder includes a main multipolar track and a multipolar track called "top turn" which are concentric, this top turn track includes M angular-distributed singularities;

A fixed sensor arranged with respect to and at a gap distance from the encoder, including at least three sensing elements where at least two are positioned with respect to the main track so as to deliver two periodic electrical signals S1, S2, in quadrature, where at least one is positioned with respect to the top turn track so as to deliver an electrical signal S3, the sensor includes a suitable electronic circuit, so that from signals S1, S2 and S3, it delivers two squared digital position signals A, B in quadrature which represent the angular position of the turning device and a top turn signal C in the form of M pulses per turn of the encoder;

A processing device for signals A, B, C which includes a means for counting suited to determine, starting from the initial positions, the variations of the angular position encoder;

Means for measuring the angular position of the turning devices with an angular uncertainty $\Delta\theta$;

in which the M singularities are each representative of an absolute angular position of the turning device and are distributed over the top turn track with an angular separation between each of them greater than $2\,\Delta\theta$, the processing device includes means for updating the initial position which, upon detecting a pulse, are capable of discriminating the pulse detected as a function of the angular position coming from the means of measurement and assigning, with respect to the initial position, the absolute angular position value associated with said pulse.

According to a second feature, the invention proposes a bearing equipped with such a determination devices, of a type including a fixed bearing race intended to be associated with a fixed device, a turning bearing race intended to be set in rotation by the turning device and the bearings arranged between said bearing races, in which the encoder is associated with the turning bearing race.

According to a third feature, the invention proposes a steering system for an automobile, including such a determination device, the encoder is solidly in rotation with the vehicle steering wheel and the sensor is solidly attached to the vehicle chassis, so as to measure the absolute angular position of the steering wheel with respect to the chassis.

BRIEF DESCRIPTION OF THE DRAWINGS

Other purposes and advantages of the invention appear during the description which follows, made in reference to the attached drawings, in which.

DETAILED DESCRIPTION OF THE PREFERRED EMBODIMENTS

Figure 1:
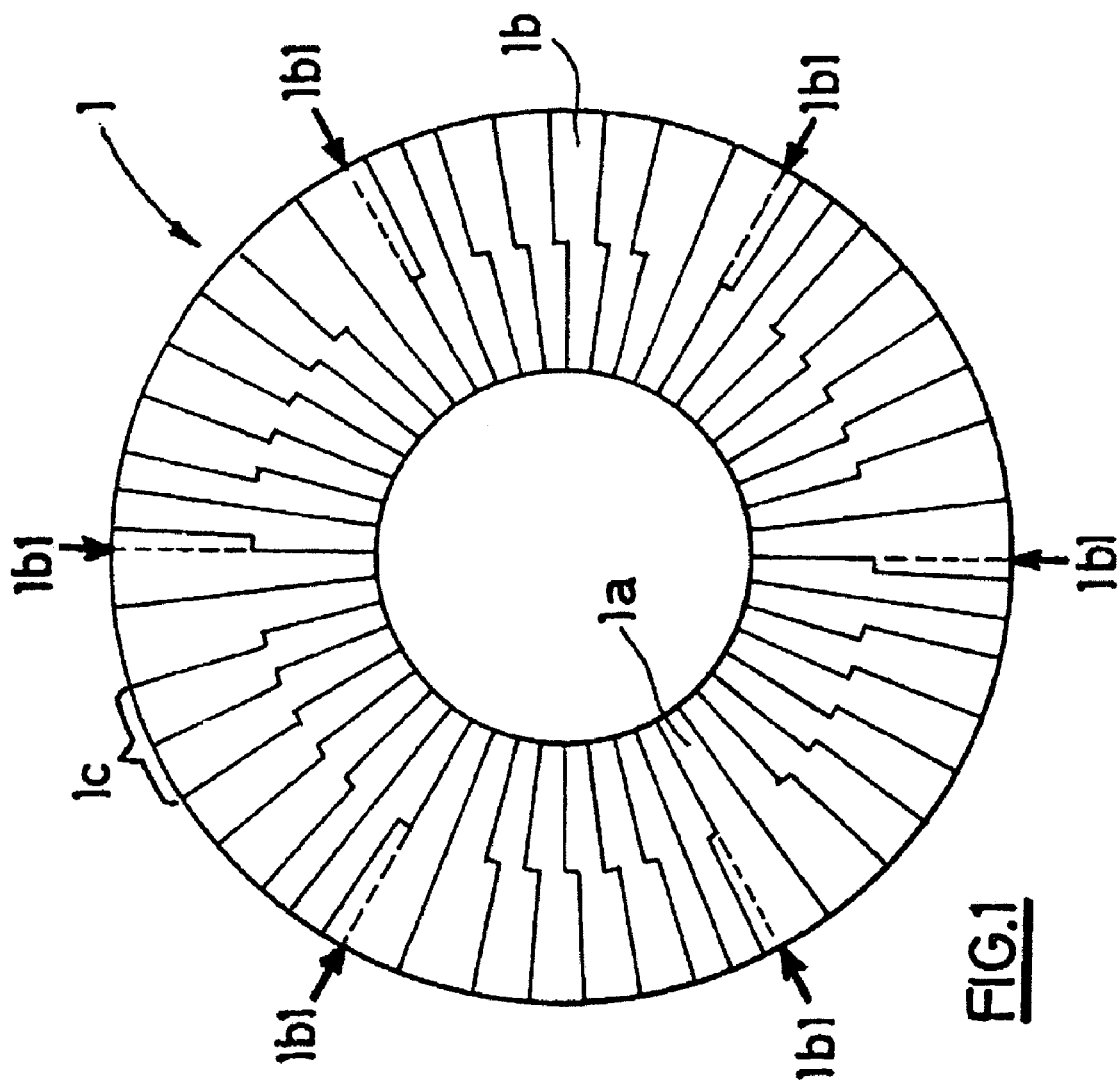
FIG. 1 is a frontal view of an encoder usable in a determination device according to the invention, said encoder includes a main multipolar track and top turn multipolar track.

The invention involves a device for determining the absolute angular position of a turning device with respect to the fixed structure, which includes an encoder 1 as represented in FIG. 1.

In a particular application envisaged, the device is incorporated into a steering system so as to measure the absolute angular position of the steering wheel 2 with respect to the chassis, this measurement may be used in the trajectory control systems of vehicles or power steering systems.

Figure 2:
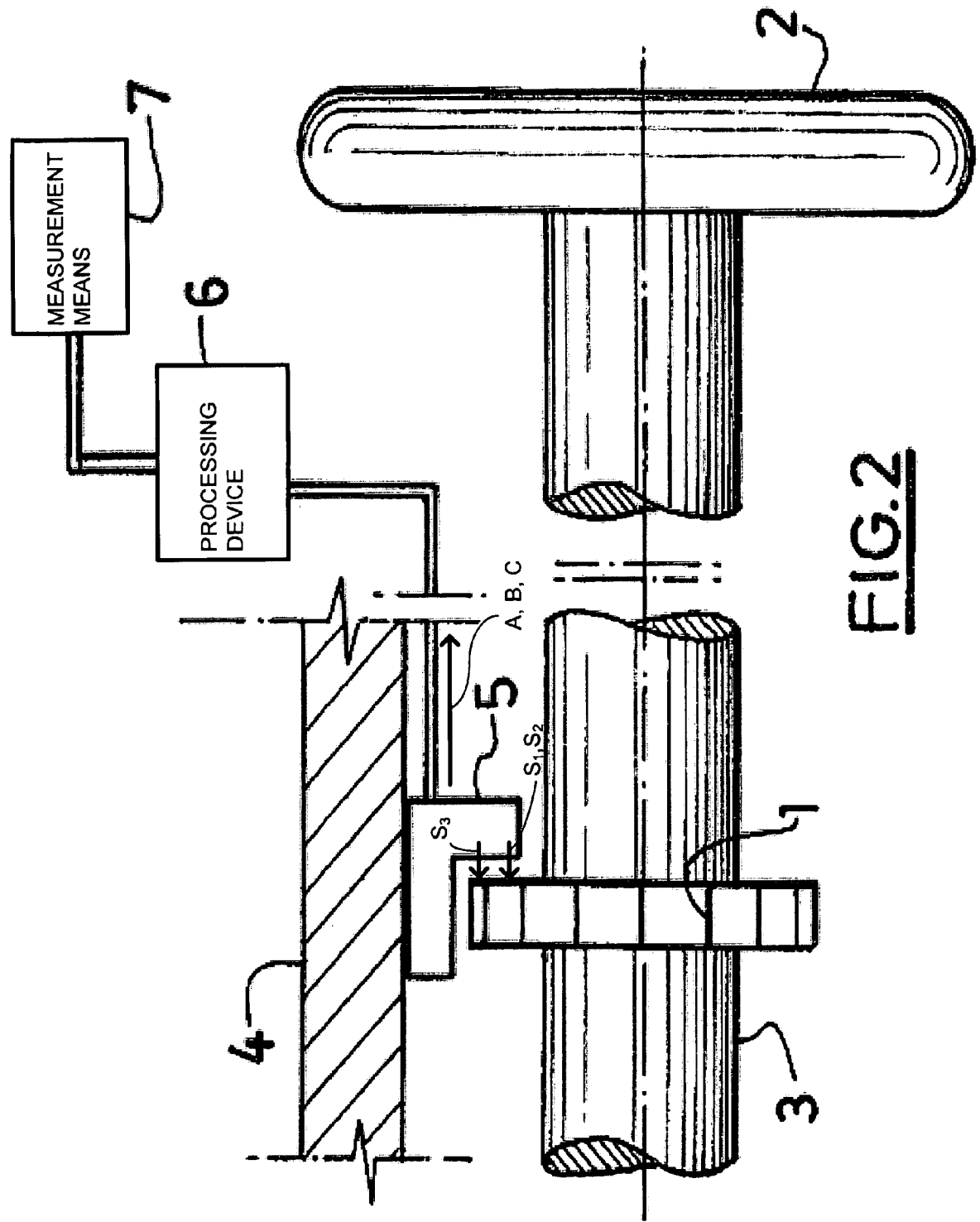
FIG. 2 is a diagrammatic and partial view of a steering system for an automobile, which is equipped with a device for determining the absolute angular position of the steering wheel.

With regard to FIG. 2, a steering system is described including a steering column 3 on which an encoder 1 is mounted as represented in FIG. 1, so as to assure the solidity in rotation of the column 3 and the encoder 1. In a known fashion, the column 3 is associated with the steering wheel 2 by means of which the driver applies a turning couple. Furthermore the column 3 is arranged so as to transmit the turning couple to the vehicle's turning wheels. For this purpose, the wheels may be mechanically linked to the steering column 3 by means of a rack and pinion so as to transform the rotation movement of the steering column 3 into angular displacement of the wheels, or is decoupled from the column 3. In this latter case, the encoder can be directly associated with a part of the steering wheel.

The steering wheel 2 is arranged so as to be able to make several turns, typically two, around the position in which the turning wheels are straight.

The steering system includes in addition a fixed element 4 which solidly attached to the vehicle automobile chassis, a sensor 5 is associated with said element so that the sensing elements of the sensor are arranged with respect to and at a gap distance from the encoder 1.

In order to determine the absolute angular position of the encoder 1, and thus of the steering wheel 2, with respect to the fixed element 4, and therefore with respect to the chassis, the encoder 1 includes a main multipolar track 1*a* and a multipolar track called "top turn" 1*b* which are concentric. The top turn track 1*b* includes M (with M>1) angular-distributed singularities 1*b*1.

In a particular example, the encoder 1 is formed by a magnetic multipolar ring on which multiple pairs 1*c* of North—South poles are magnetized equally distributed with a constant angle width so as to form the main track 1*a* and top turn track 1*b*, a magnetic singularity 1*b*1, the top turn track 1*b* which is formed by two adjacent poles, where the magnetic transition is different from the others.

According to the representation in FIG. 1, the main tracks 1*a*, arranged inside the ring, and top turn 1*b*, arranged toward the outside of the ring, including 24 pairs of poles 1*c*, the pole pairs 1*c* from the top turn track 1*b* have a phase lag φ with respect to those of the main track 1*a*.

Each singularity 1*b*1 is formed by a pair of poles 1*c*, the width of the poles is arranged so that a pole is out-of-phase by −φ with respect to the corresponding pole of the main track 1*a*. Thus, each signal pulse C corresponds to detection of the phase lag reversal between the main track 1*a* and the top turn track 1*b*.

Moreover, the sensor 5 includes at least three sensing elements where at least two are positioned with respect to the main track 1*b* and at least one is positioned with respect to the top tun track 1*b*.

In a particular example, the sensing elements are chosen from the group including the Hall effect probes, magnetoresistances, giant magnetoresistances.

The sensor 5 used is capable of delivering two periodic electrical signals S1, S2, in quadrature by means of the sensing elements arranged with regard to the main track 1*a* and an electrical signal S3 by means of the sensing elements arranged with regard to the top turn track 1*b*.

The principle for obtaining signals S1 and S2 from a multitude of aligned sensing elements is described for example in the document FR-2 792 403 coming from the petitioner.

But the sensors include two sensing elements which are capable of delivering the signals S1 and S2 are also known.

The sensor includes in addition an electronic circuit which from the signals S1, S2 and S3, delivers the squared digital position signals A, B in quadrature and a top turn signal C in the form of M electrical pulses per revolution of the encoder 1.

A principle for obtaining the digital signals A, B and C, as well as the different modes of realizing the magnetic singularities 1*b*1, are described in the documents FR-2 769 088 and EP-0 871 014.

According to one implementation, sensor 5 includes in addition an interpolator, of a type for example described in document FR-2 754 063 from the petitioner, allowing the output signal resolution to be increased.

The sensor 5 may be incorporated on a silicon or similar substrate for example AsGa, so as to form an integrated circuit and customized for a specific application, a circuit sometimes denoted under the term ASIC (Application Specific Integrated Circuit) to refer to an integrated circuit designed entirely or partially as a function of its purpose.

Although the description is made in relation to a magnetic encoder/sensor assembly, it is also possible to implement the invention in an analogous fashion using an optical sensor. For example, the encoder 1 can be formed by a metal or glass tracking pattern on which the main track 1*a* and the top turn track 1*b* are engraved so as to form an optical pattern analogous to the multipolar magnetic pattern stated above, the sensing elements are then formed by optical detectors.

The determination device includes besides a processing device 6 for the signals A, B, C which includes a means for counting capable of determining, from the initial position, the variations of the angular position of encoder 1. In the implementation example, the means of counting includes a register in which the angular position value is increased or decreased corresponding to the number of wavefronts of the A and B signals detected, where the initial values is for example fixed at zero on commissioning the device. Thus the decoder allows determining the relative position of the encoder 1 with respect to the initial position.

In addition, the determination device includes the means for measuring 7 the angular position of the turning device with an angular uncertainty Δθ. The means for measurement 7 may include electromechanical means associated with the turning device, such as a potentiometer.

In the steering system application, the means for measurement 7 may include a resource for analyzing the differential speed of the vehicles wheels. Effectively, the differential speed of the wheels varies as a function of the turning angle which, as a function of the sign and the modulus, allows discriminating from said speed, the angular position of the steering wheel. In this case the angular uncertainty depends on the model used to learn the differential speed as a function of the turning angle, as well as the rolling conditions. According to one implementation the analysis of the differential speed may be realized on wheels which are not drive wheels so as to limit the errors which may be induced by skidding of the drive wheel. In one variant, the analysis may be performed on two sets of wheels so as to correct each one of the differential speeds obtained.

In one implementation, the means for measurement 7 may include an accelerometer or a gyroscope.

With the set of the measurement means, the angular position of the turning device can only be obtained with an uncertainty of Δθ which is too significant to be able to determine the absolute angular position of the turning device with sufficient precision within the scope of the applications envisaged. Effectively the uncertainty Δθ is typically between 10° and 60°.

In order to obtain the absolute angular position of the turning device with sufficient precision, it is foreseen using the encoder 1 where the distribution is specific of the singularities 1*b*1 on the top turn track 1*b*.

In the implementation mode represented in FIG. 1, the top turn track 1*b* includes 6 singularities 1*b*1 spaced at 60θ from one another. Prior to the use of the determination device, the absolute angular position of one or several singularities 1*b*1 of the top turn track 1*b*1 can be indexed to a reference position. In particular, in one application of this type of steering system, the reference position can be the in-line position of the wheels. This indexing can be implemented in string output and on a dedicated instrument bench, the values of the absolute positions can be stored in a EEPROM or flash type memory of the processing device. This indexing can also be realized in a mechanical way.

Thus, upon detection of a top turn pulse, the absolute angular position of the turning device is 0θ modulus 60θ. Such an encoder is thus intended to be used in combination with a means for measurement 7 where the angular uncertainly is strictly less than 30θ, so as to be able to discriminate the pulse detected through a means for updating.

In one particular example, the means for measuring has an angular uncertainty of the order of 16θ. Thus upon detecting a pulse, if the angle measured by the means for measuring 7 is assessed at 49θ±16θ, the pulse is identified in an unequivocal manner as corresponding to the absolute angular position equal to 60θ.

Thus upon the detection and discrimination of the pulse, the absolute angular position is assigned, with respect to the initial value, in the processing device through a means for updating, so as to determine in a continuous fashion, the absolute angular position through a means for counting.

According to one implementation mode, the processing device is a microprocessor arranged to receive the signals A, B, C coming from the sensor 5, in which the absolute angular position associated with the pulses are stored.

According to the invention, it is thus possible, after commissioning the device, to learn the absolute position of the encoder 1, and thus the position of the associated turning device, after it has turned through a maximum angle equal to 2 Δθ. In addition, the absolute angular position is determine with an accuracy greater than Δθ which no longer depends on the resolution of the means for measurement 7.

As a function of the means for measurement 7 used, it is possible to distribute the singularities 1b1 over the top turn track 1b so as either to increase or decrease the maximum rotation angle to allow the determination of the absolute angle. In addition it is also possible to have the number of pole pairs 1c and/or the encoder dimensions vary.

It can also be foreseen that the singularities 1b 1 are not equidistant on the top turn track 1b, and specifically if the uncertainty Δθ is not constant as a function of the measured angular position.

Figure 3:
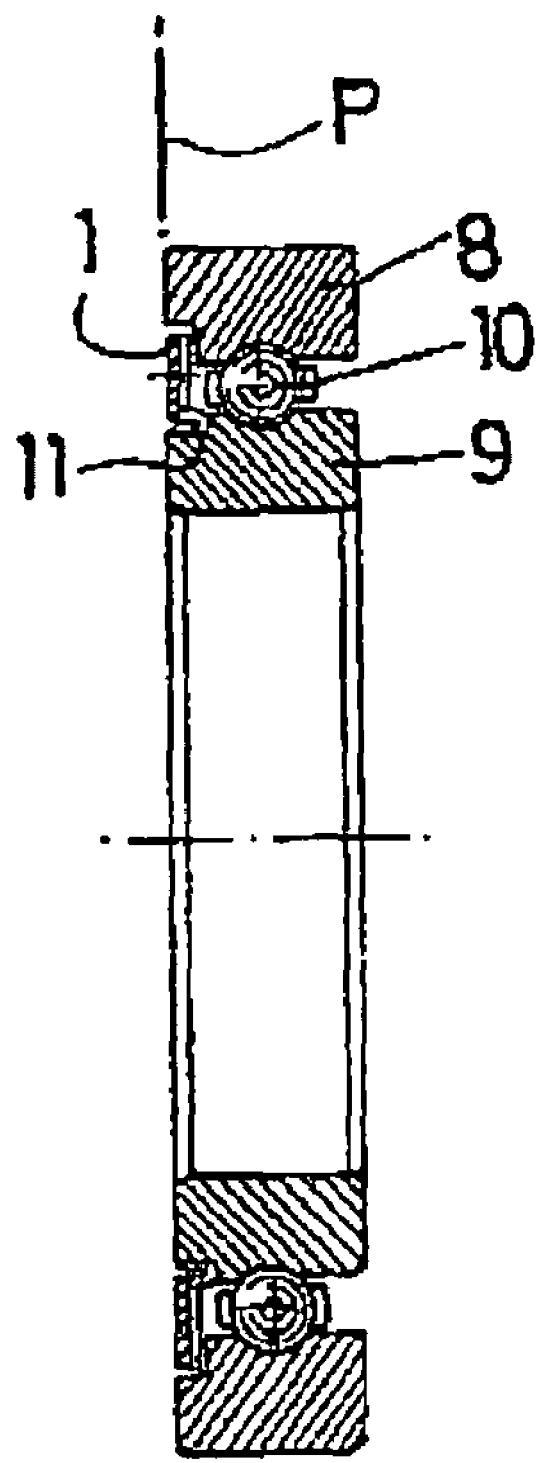
FIG. 3 is a view in longitudinal cross-section of a bearing equipped with a device for determining the absolute angular position of the turning bearing race with respect to the fixed bearing race, the sensor, the signal processing device and the means for measuring angular position are not represented.

In regard to FIG. 3, a bearing is described including a fixed external race 8 intended to be associated with a fixed device, a turning internal race 9 intended to be set in rotation by the turning device and the bearings 10 arranged between said races.

In the represented implemented mode, the encoder 1 is duplicate molded on a annular cylindrical roll neck of an armature 11, which is associated for example by the fit, on the face of the internal bearing race 9.

The encoder 1 is associated with the turning bearing race 9 so that the external face of said encoder is essentially contained in the plane P of a lateral face of the fixed bearing race 8. This feature which is specifically disclosed in the document EP-0 607 719 from the petitioner, allows on the one hand protecting the encoder 1 within the bearing and on the other hand to be able to separate the sensor 5 from the bearing with regard to controlling the gap distance.

In one implementation mode, the wheel is guided in rotation by such a bearing so as to determine the absolute angular position of the steering wheel 2 with respect to the chassis, as well as the steering functions and angle measurements are determined by means of a similar mechanical device.

The invention claimed is:

1. A device for determining the absolute angular position of a turning device with respect to a fixed structure, said device comprising:

an encoder adapted for rotation with the turning device, wherein said encoder includes a main multipolar track and a top turn track which are concentric, and said top turn track includes M angular distributed singularities;

a fixed sensor arranged at a gap distance with regard to the encoder, the sensor including at least three sensing elements where at least two are positioned with regard to the main multipolar track so as to deliver two periodic signals S1, S2 in quadrature and at least one is positioned with regard to the top turn track so as to deliver an electrical signal S3, the sensor further including an electronic circuit capable of delivering, starting from the signals S1, S2 and S3, two squared digital position signals (A, B) in quadrature which are representative of the angular position of the turning device and one top turn signal (C) in the form of M pulses per revolution of the encoder;

a processing device configured to process the signals (A, B, C) and including a means for counting, to determine, starting from an initial position, variations of the angular positions of the encoder; and means for measuring the angular position of the turning device with an angular uncertainty of Δθ in which the M singularities are each representative of an absolute angular position of the turning device and are distributed in the top turn track with an angular distribution between them which is greater than 2Δθ, wherein the processing device includes a means for updating the initial position, which upon detecting a pulse, discriminates the pulse detected as a function of the angular position coming from the means for measuring and assigns a value, with respect to the initial position, of the absolute angular position associated with said pulse.

2. The device according to claim 1, wherein each main multipolar track is in the form of a magnetic ring on which equispaced North and South magnetic poles are magnetized with a constant angular width, and a magnetic singularity from the top turn track is formed from two adjacent poles where the magnetic transition is different from the others.

3. A bearing equipped with a determination device according to claim 1, wherein the bearing is of the type including a fixed bearing race intended to be associated with a fixed device, a turning bearing race intended to be set in rotation by the turning device and bearings arranged between said bearing races, and wherein the encoder is associated with the turning bearing race.

4. The bearing according to claim 3, wherein the sensor is associated with the fixed bearing race.

5. A steering system for an automotive vehicle, wherein the steering system includes a determination device according to claim 1, and wherein the encoder is solidly in rotational relationship with a vehicle steering wheel and the sensor is attached solidly to a vehicle chassis, so as to measure the absolute angular position of the steering wheel with respect to the chassis.

6. The steering system according to claim 5, further comprising a revolution or sector discrimination means that includes a means of analyzing a differential speed of vehicle wheels.

7. The steering system according to claim 5, wherein the means for measuring the angular position includes an accelerometer or a gyroscope.

* * * * *